UNITED STATES PATENT OFFICE.

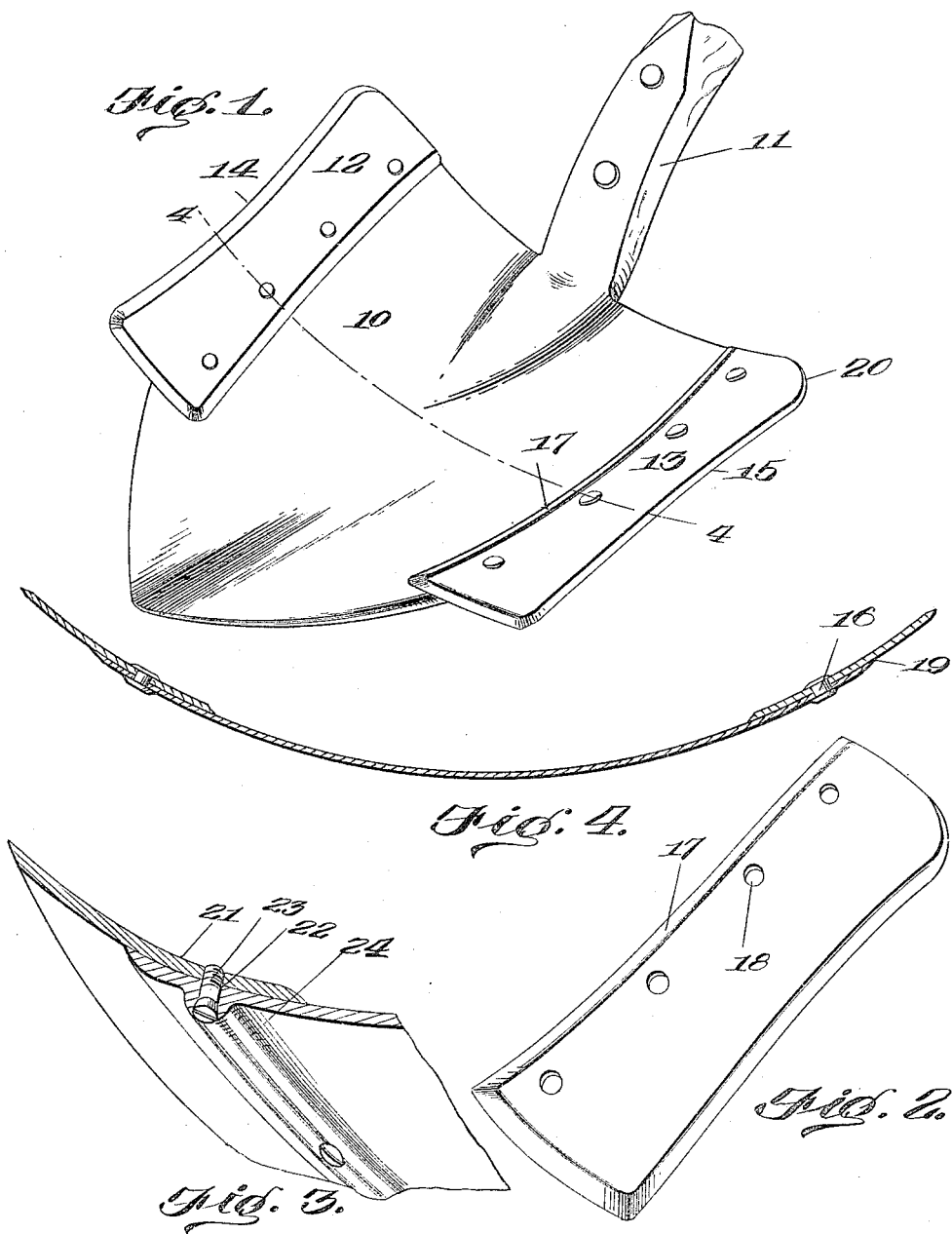

VICTOR LEON LOPEZ AND AMADO L. ROMERO, OF MONTECITO, CALIFORNIA.

COMBINATION SHOVEL AND AX.

1,124,046.  Specification of Letters Patent.  Patented Jan. 5, 1915.

Application filed December 31, 1913. Serial No. 809,705.

*To all whom it may concern:*

Be it known that we, VICTOR LEON LOPEZ and AMADO L. ROMERO, citizens of the United States, residing at Montecito, in the county of Santa Barbara and State of California, have invented certain new and useful Improvements in Combination Shovels and Axes, of which the following is a specification.

This invention relates to new and useful improvements in shovels, and as its principal object aims to provide a device of this character which is equipped with a pair of cutting blades which are arranged one on each side of the shovel and are adapted to be employed as axes.

There has been a long felt want among forest fire fighters for a combination tool which might be used either in digging a trench or for cutting down brush and small saplings. The present invention provides, therefore, a shovel which is equipped with a pair of cutting blades so arranged with respect to the shovel blade that they may be conveniently employed in the same manner as an ordinary ax is used.

One of the principal objects of this invention is to construct the combination shovel and ax in such manner that it may be cheaply manufactured, and will be durable and efficient in its action.

The above and additional objects are accomplished by such means as are illustrated in the accompanying drawings, described in the following specification, and then more particularly pointed out in the claims which are appended hereto and form a part of this application.

With reference to the drawings, wherein there has been illustrated the preferred form of this invention as it is reduced to practice, and throughout the several views of which similar reference numerals designate corresponding parts, Figure 1 is a perspective view of the combination shovel and ax, showing the preferred embodiment of the device; Fig. 2 is a perspective view illustrating in detail the cutting blade which is carried by the shovel; Fig. 3 is a perspective view looking at the bottom side of the shovel and illustrating a modified form of the tool; and Fig. 4 is a section on the line 4—4 of Fig. 1.

Proceeding now to the description of the drawings, and referring particularly to Fig. 1 in which the preferred embodiment of the invention is illustrated, the numeral 10 designates the shovel blade which is of the usual conformation, and is, of course, equipped with a handle 11. On each side of the shovel blade is secured a cutting blade, as indicated at 12 and 13. These cutting blades 12 and 13 are adapted to be employed in the same manner as were the shovel in reality an ax. These blades 12 and 13 are secured to the upper face of the member 10 and are arranged so that their cutting edges, indicated at 14 and 15 respectively, lie beyond the adjacent edges of the shovel. In the preferred embodiment, the cutting blades are fixedly secured to the member 10 by means of rivets, as indicated at 16 in Fig. 4.

As shown in Fig. 2, each blade is formed from a substantially rectangular strip of metal, tempered steel being preferably employed. The inner longitudinal edges of these blades, as indicated at 17, in Fig. 2, are beveled, so that the blades merge into the upper face of the shovel blade for the obvious purpose of permitting the shovel to be urged into the ground without undue exertion, as would be necessary were the inner edge of each blade not beveled in the manner illustrated.

A longitudinally extending series of spaced apertures 18 is formed in each cutting blade adjacent the inner longitudinal edge 17 thereof. When the blades are attached to the member 10, these apertures are brought into registration with the apertures formed in the member 10, so that the rivets 16 may be properly applied.

It will be seen upon reference to Fig. 2 that the edges of the shovel blade 10 are beveled so that they will merge into the under faces of the cutting blades, as at 19 in Fig. 4. The lower transverse edges of the members 12 and 13 are sharpened and extend approximately at right angles to the cutting edges 14 and 15. The upper transverse edges of the cutting blades, however, are rounded, as indicated at 20. The purpose of thus forming the upper terminals of the cutting blades is to facilitate the withdrawal of the shovel from the ground, it being obvious that were the upper transverse edges extended at right angles to the longitudinal cutting edges relatively abrupt corners would be formed which would engage the soil when the shovel is being withdrawn from the ground, thus hindering the operator materially. The longitudinal edges 14 and 15 are curved inwardly, as illustrated in Fig. 1.

From the foregoing description, it will be readily understood that the combination tool of this invention may be efficiently employed as a shovel for digging trenches, or may be utilized as an ax for cutting brush and small saplings. It will be further observed that the lower transverse edges of the cutting blades will sever all roots which may be in the path of the shovel as it is inserted in the ground.

It has been found that in some cases it is desirable to equip the shovel with removable cutting blades so that it may be quickly converted from an ordinary shovel into a combination tool of the type shown in Fig. 1. There has been incorporated in the drawings, therefore, a modified form of the invention, as in Fig. 3. In this figure, it will be seen that the cutting blade 21 is substantially identical to the members 12 and 13 of the preferred form with the exception that it is provided with threaded bores 22 instead of the apertures 18. These bores are formed in the modified blade so that screws, indicated at 23, may be employed in detachably securing the blade to the shovel. A longitudinally extending rib 24 has been formed adjacent each edge of the shovel in the modified form so that the heads of the screws 23 may be embedded in the body of the shovel, thus facilitating the insertion of the shovel in the ground. These ribs 24 are gradually tapered toward the lower end of the shovel so that they will merge into the lower face thereof.

From the foregoing description, it will be readily seen that the modified form of tool may be quickly converted from an ordinary shovel into a combination shovel and ax by merely attaching the blade by means of the screws 23.

In conclusion, it is desirable to direct attention to the fact that while this combination tool has been designed with particular reference to the needs of forest fire fighters, it may, nevertheless, be employed in digging irrigation ditches or trenches such as are made by an army when throwing up temporary fortifications.

In reduction to practice, it has been found that the form of this invention illustrated in the drawings, and described in the above specification as the preferred embodiment, is the most efficient and practical; yet realizing the fact that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

What is claimed is:—

1. In a device of the character described, a shovel blade, a pair of substantially rectangular cutting blades, each of said cutting blades having a transverse and a longitudinal cutting edge, and means for detachably securing the cutting blades to the shovel blade so that their longitudinal cutting edges will lie beyond the adjacent edges of the shovel blade.

2. In a device of the character described, a shovel blade, and a pair of substantially rectangular cutting blades detachably secured thereto, the longitudinal edges of the cutting blades being curved inwardly, the upper corners of the cutting blades being rounded and the lower transverse edges of the cutting blades being sharpened and disposed at an approximate right angle to the longitudinal center line of the shovel blade.

3. In a device of the character described, a shovel blade having longitudinally extending ribs formed on its face and adjacent its longitudinal edges, said ribs being formed with longitudinally extending series of spaced apertures, a pair of cutting blades mounted on the upper face of the shovel blade, and screws insertible through the apertures of the ribs and engageable with threaded bores formed in the cutting blades for securing the cutting blades in operative position on the shovel blade.

4. In a device of the character described, a shovel blade, and a pair of cutting blades removably secured thereto, said cutting blades being substantially rectangular in shape and having their lower edges sharpened to produce transverse cutting edges and having their exterior longitudinal edges sharpened to produce longitudinal cutting edges.

5. In a device of the character described, a shovel blade, and a cutting blade removably secured to the shovel blade at one side thereof, said cutting blade having a straight transverse cutting edge and a curved longitudinal cutting edge.

6. In a device of the character described, a shovel blade having a longitudinally extending rib formed on its rear face, there being threaded bores extending through the rib and adjacent portion of the blade, and a cutting blade mounted on the upper face of the shovel blade and having threaded openings adapted to register with the threaded bores of the shovel blade, and screws threaded through the rib and shovel blade and into engagement with the cutting blade for detachably securing said cutting blade in position on the shovel blade, said cutting blade having its longitudinal cutting edge disposed beyond the edge of the shovel blade.

7. In a device of the character described, a shovel blade and a cutting blade secured to the shovel blade at one edge thereof, said cutting blade having a transverse cutting edge and a curved longitudinal cutting edge.

In testimony whereof we affix our signatures in presence of two witnesses.

VICTOR LEON LOPEZ. [L. S.]
AMADO L. ROMERO. [L. S.]

Witnesses:
G. E. HENDRICKS,
MARY W. ROSS.

Copies of this patent may be obtained for five cents each, by addressing the "Commissioner of Patents, Washington, D. C."